United States Patent [19]

Lowder et al.

[11] 4,061,392
[45] Dec. 6, 1977

[54] SIDE TILT INTEGRATED CAB

[75] Inventors: James E. Lowder; Gary D. Perry, both of Lubbock, Tex.

[73] Assignee: Eagle-Picher Industries, Inc., Cincinnati, Ohio

[21] Appl. No.: 768,629

[22] Filed: Feb. 14, 1977

Related U.S. Application Data

[63] Continuation of Ser. No. 542,405, Jan. 20, 1975, abandoned.

[51] Int. Cl.² ............................................. B62D 27/00
[52] U.S. Cl. ................. 296/28 C; 180/89.14; 280/755; 296/35 A; 296/102
[58] Field of Search .................. 296/35 B, 35 A, 28 C, 296/28 F, 102; 280/150 C; 180/89 R, 89 A

[56] References Cited

U.S. PATENT DOCUMENTS

| | | | |
|---|---|---|---|
| 3,527,474 | 9/1970 | Boersma | 296/102 |
| 3,578,377 | 5/1971 | Babbitt et al. | 296/102 |
| 3,785,696 | 1/1974 | Moore et al. | 296/102 |
| 3,866,942 | 2/1975 | Dobevs et al. | 280/150 C |

*Primary Examiner*—Richard A. Bertsch
*Attorney, Agent, or Firm*—Cushman, Darby & Cushman

[57] ABSTRACT

In an earth scraper tractor a rigid side-tilt roll-over protection cab having the operator's seat secured to the cab rather than to the tractor frame is mounted on the tractor frame in a manner such that, in the event of roll-over, the mounting means plastically deforms without deformation of the cab, thereby absorbing impact energy, maintaining the integrity of the cab and preventing the cab from being torn loose from the cab. The mounting means includes a pair of transverse frame members secured to the tractor frame so as to extend outboard thereof and supporting the cab from below by pin connections which serve as part of the tilting mechanism. Also forming part of the mounting means is a deformable post member rigidly connected to the cab and pin-connected at its lower end to the tractor frame.

1 Claim, 5 Drawing Figures

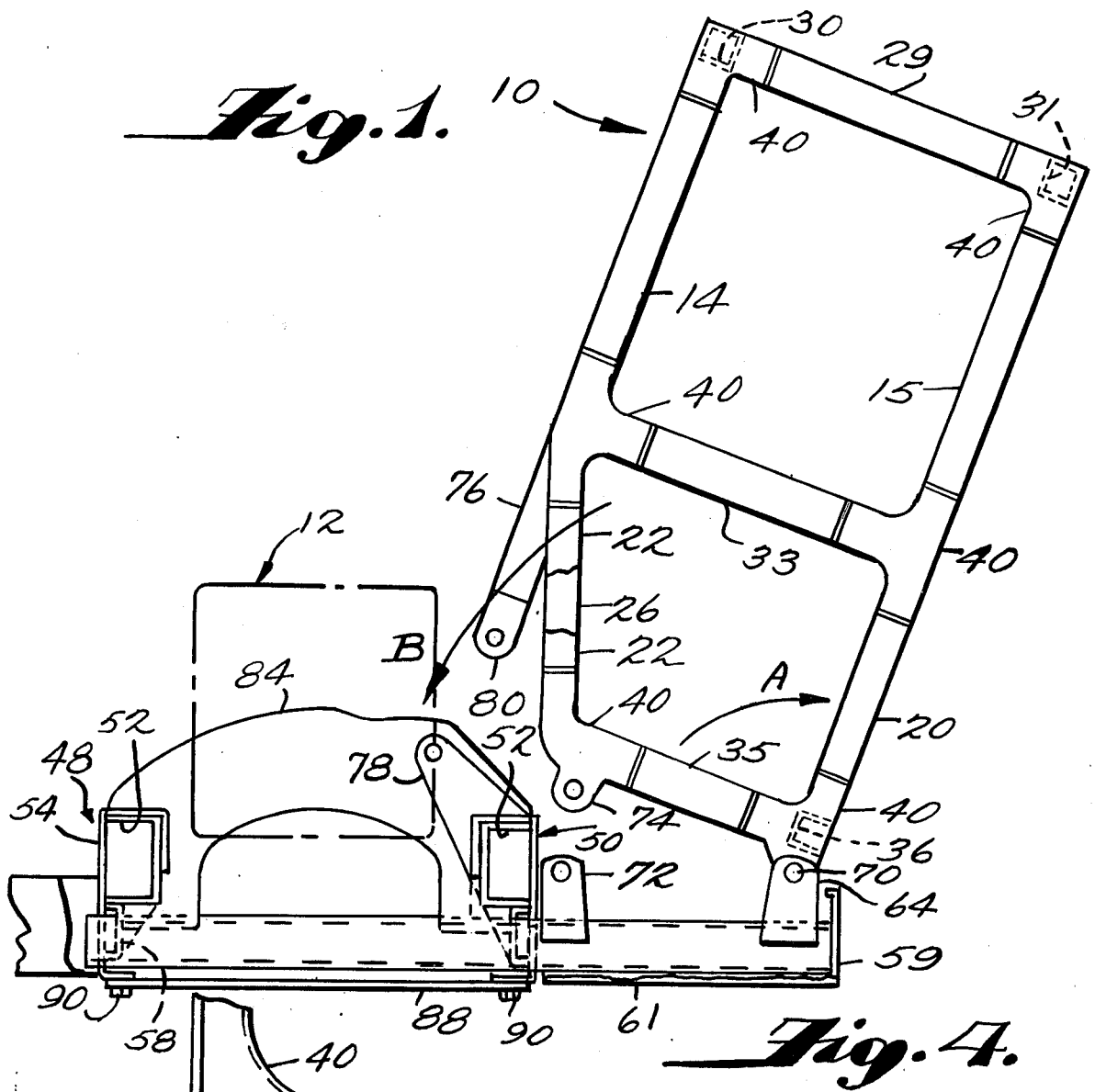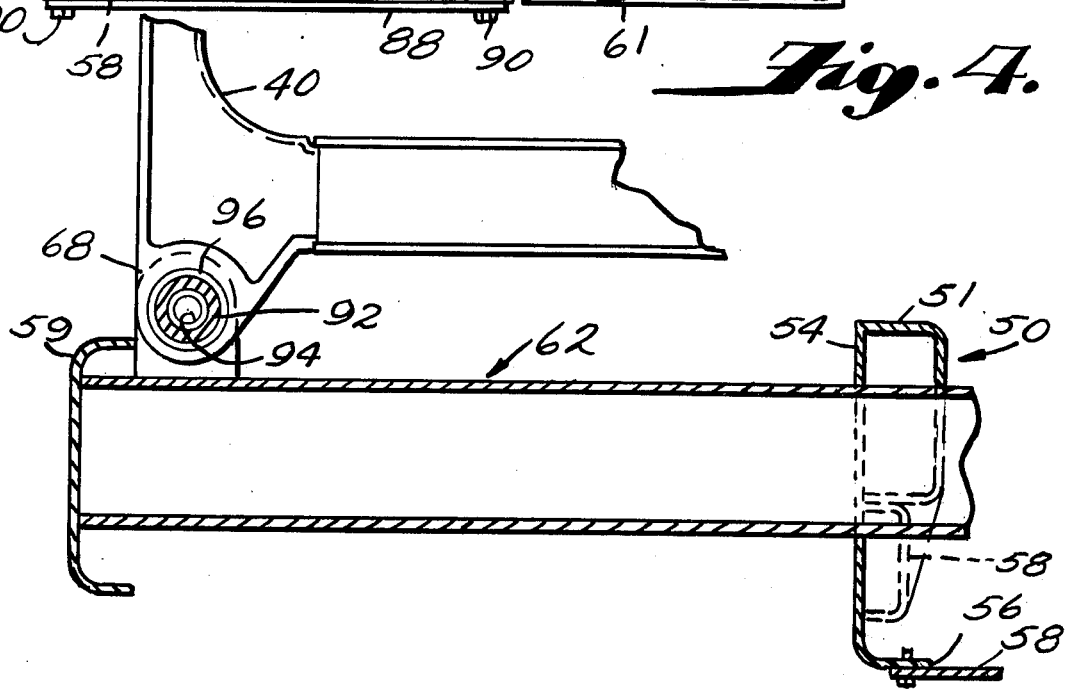

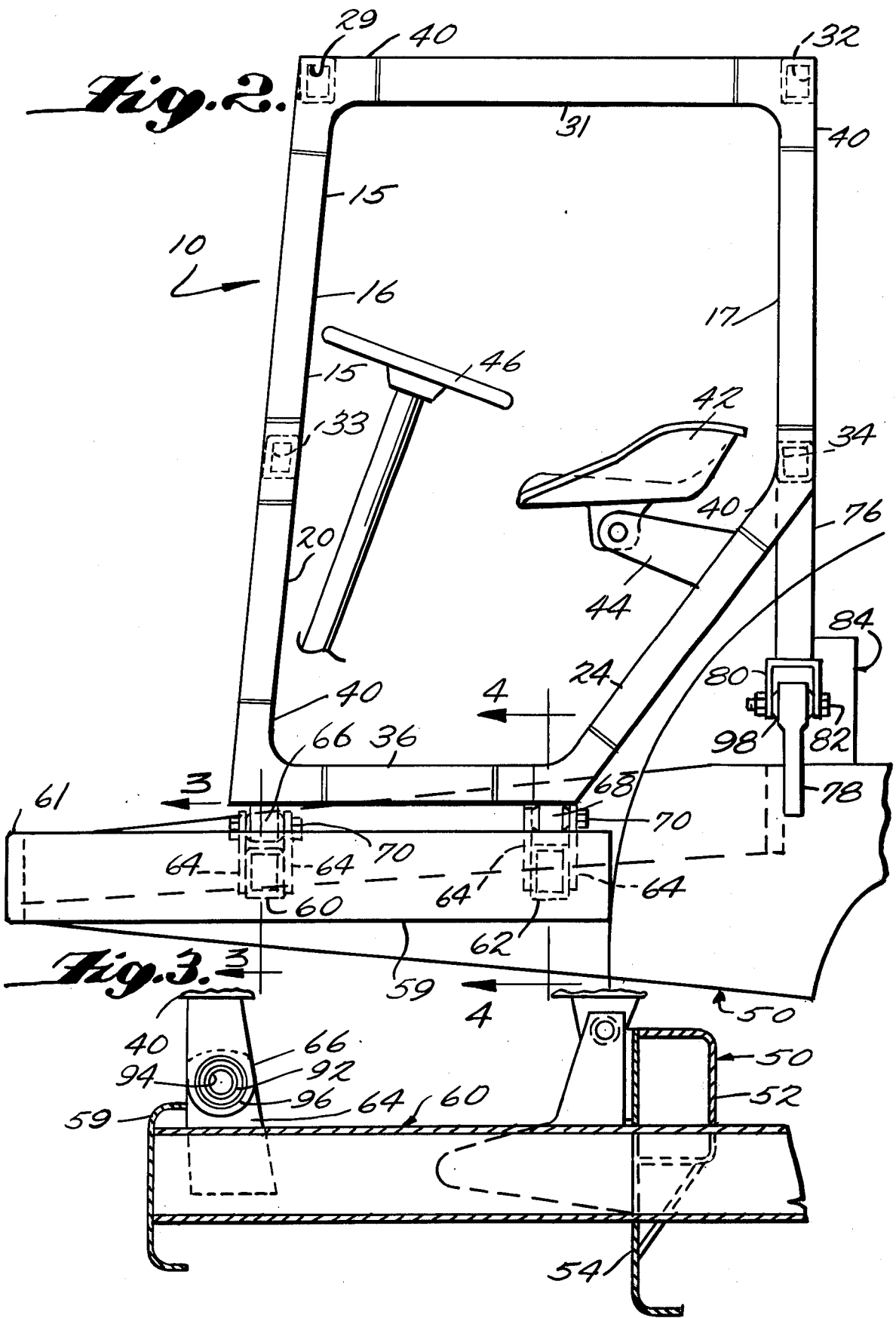

SIDE TILT INTEGRATED CAB

This is a continuation of application Ser. No. 542,405 filed Jan. 20. 1975, now abandoned.

BACKGROUND OF THE INVENTION

A. Field of the Invention and Prior Art

This invention relates to the construction of cabs or compartments for use on earth moving equipment and other vehicles and more particularly to improved constructions for roll-over protection, for side-tilt cab designs and for sound suppression.

In recent years the design of operator cabs for heavy vehicles such as earth moving equipment has aimed toward operator safety while at the same time avoiding as much as possible the addition of extra weight. It has also been an aim to locate the cab in an optimum position for operator visibility and to maintain a compact arrangement of cab and vehicle while still providing access to the vehicle engine. Some of these objects are realized at least in part by employing a side-tilt cab which is pivotable away from the engine about an axis generally parallel to the longitudinal axis of the vehicle. U.S. Pat. No. 3,578,377 discloses a roll-over protection frame which is mounted on an earth moving vehicle so that the frame may be tilted to one side thereof. Access is thereby provided to the engine compartment within the frame of the vehicle. In this patent, vertical members or posts are secured by pins to brackets which are welded to the vehicle chassis. The roll-over protection frame may be tilted to one side of the chassis by first removing the pins and bolts. A tilt mechanism is further provided which may be actuated to pivotally displace or tilt the roll-over protection frame to one side. While U.S. Pat. No. 3,578,377 discloses the side tilt concept, there is no disclosure of an integrated cab having a supporting post or the like which will collapse allowing the cab to rotate as a unit when the cab contacts the ground during a vehicle roll-over.

Another example of a roll-over protection cab is set forth in U.S. Pat. No. 3,768,856 which discloses restraining links pivotally attached between cab and frame to permit arcuate movement of the cab structure when a certain minimum load is laterally applied thereto. However, these restraining links are not formed as an integral part of the cab structure and thus require additional space on the vehicle.

A pivotally mounted tractor roll bar is disclosed in U.S. Pat. No. 3,527,474 wherein lugs are secured to a roll bar and have apertures through which a sleeve-like rubber insert is disposed, a bolt being inserted to secure the lug to the frame. This patent does not incorporate the roll bar as part of the cab structure, and the rubber flexible inserts are not formed on the struts of the roll-over protection bar.

SUMMARY OF THE INVENTION

The present invention contemplates a rigid cab mounted on the vehicle frame in such a manner that in the event of roll-over the mounting means plastically deforms without deformation of the cab, thereby maintaining the integrity of the cab even if the cab should be separated from the vehicle. The cab is of box-construction in that it includes a frame constructed of rigid interconnected members defining a hollow box or cage for the operator and his controls, and the special mounting means are connected between the cab frame and the vehicle frame. The operator's seat is rigidly connected to the cab frame, rather than to the vehicle frame, so that relative movement between the cab and the vehicle frame during an accident does not change the position of the operator relative to the cab.

In the preferred embodiment the mounting means includes spaced-apart transverse beam members secured to the tractor frame so as to support the cab from below, and a post member rigidly connected to the cab frame and to the vehicle frame at a location such that the post member receives compression and bending forces in the event of roll-over. The transverse beam members preferably extend laterally outwardly of the vehicle frame so that the cab is located outboard of the vehicle frame, and in this case the post member is located at the inboard side of the cab so as to extend downwardly from its connection with the cab frame.

In the preferred construction summarized above the lower end of the cab frame is pin-connected to the transverse beams for lateral outward tilting movement about an axis which is generally parallel to the longitudinal axis of the vehicle. In this regard the cab frame is preferably constructed with its inboard side wall inclined upwardly and inwardly toward the longitudinal axis of the vehicle. With this arrangement a relatively small tipping movement of the cab brings the side wall to a vertical position thereby creating a maximum amount of access space adjacent the engine. The post member, which is located inboard of the tilt axis, extends downwardly from its point of connection with the vehicle frame and is releasably connected at its lower end to the vehicle frame. This connection must be released in order for the cab to tilt.

In the event of a vehicle roll-over or other accident which results in laterally inward forces on the cab the forces are transmitted through the rigid cab frame primarily to the post and to the transverse beams. The post being inboard of the connection between the cab frame and beams is placed in compression, and simultaneously bending forces are exerted on the transverse beams. The various structural members are so constructed and arranged that the post and transverse beams will undergo plastic deformation without deformation of the rigid cab frame, whereby a large amount of energy is absorbed. Even if the forces are sufficient to break the connections between the cab frame and the vehicle frame, so that the cab is torn loose, the integrity of the cab is preserved. Separation of cab and vehicle is not normally expected, because elements other than the transverse beams and the post may also plastically deform and thereby absorb additional energy.

Another object of the present invention is to provide a side tilt integrated cab which posts providing the frame structure for the cab are flexibly mounted to the vehicle chassis or frame. The flexible mounting comprises the insertion of commercially available rubber sleeves into an aperture formed adjacent to the bottom of a post. The posts are disposed within adjacent mounts or clevises on the frame. A pin or bolt is inserted through the rubber sleeve to thereby provide a flexible connection between the frame and the cab. The integrated construction also make possible the inclusion of constructional features which allow for simpler sound suppression.

BRIEF DESCRIPTION OF THE DRAWINGS

Novel features of the improved side tilt integrated cab providing a roll-over protection device in accordance with the present invention will be more readily understood from a consideration of the following description taken together with the accompanying drawings, a preferred embodiment being illustrated with the various parts thereof identified by suitable reference characters in each of the views, and in which:

FIG. 1 is a front view of a side tilt integrated cab embodying the principles of the present invention wherein mounting bolts have been removed from one side of the cab to enable the cab to be tilted;

FIG. 2 is a side view of the integrated cab of FIG. 1 secured to the vehicle frame;

FIG. 3 is a view taken along lines 3—3 of FIG. 2;

FIG. 4 is a view taken along lines 4—4 of FIG. 2; and

Figure 5:
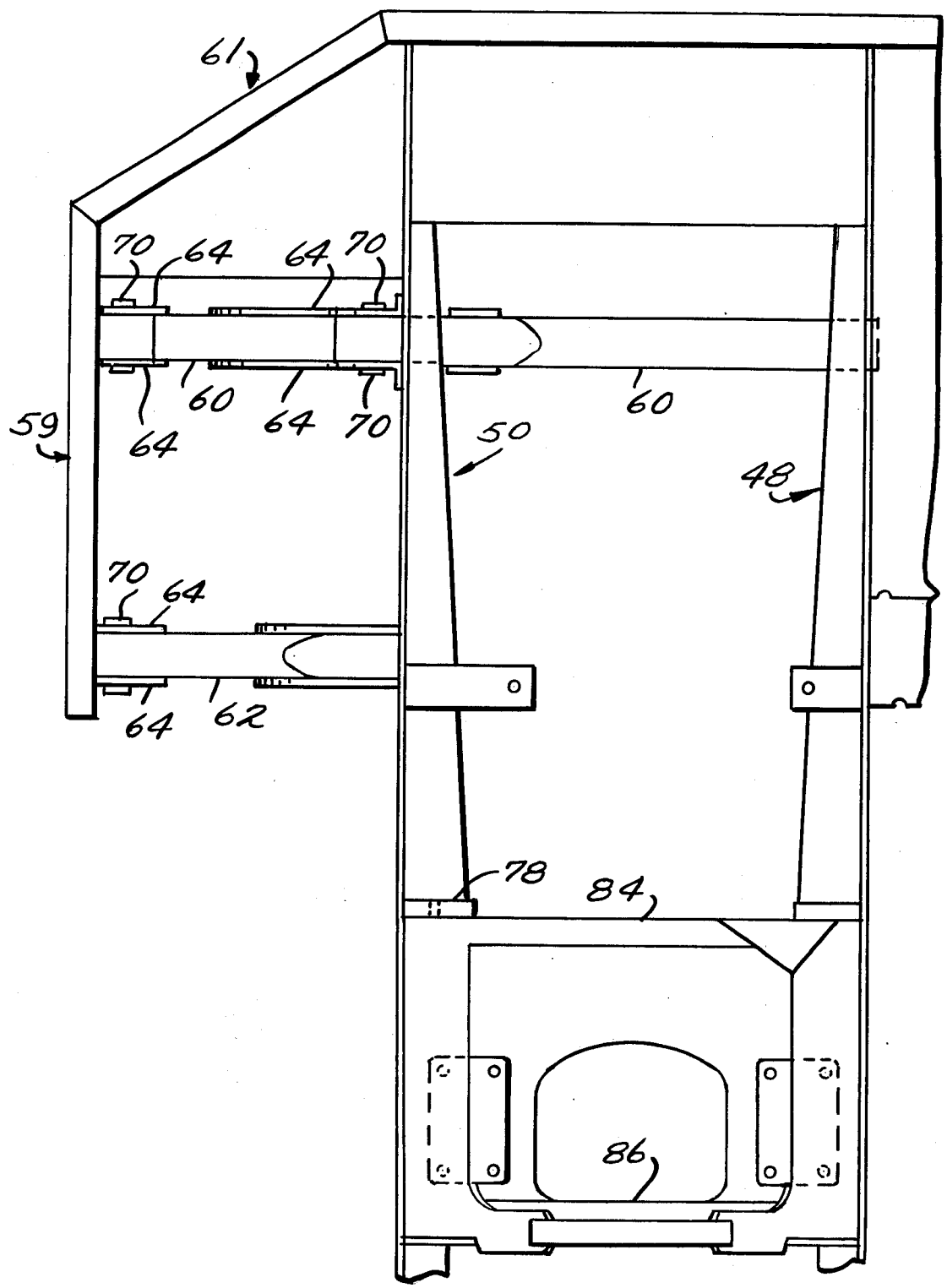
FIG. 5 is a plan view of the forward portion of the vehicle frame with the cab removed.

In all of the figures some parts which are unnecessary to an understanding of the invention have been omitted in the interest of clarity.

DETAILED DESCRIPTION

Referring to FIGS. 1 and 2 there is illustrated a side-tilt integrated operator's cab frame 10 mounted on the main frame of a power-driven earth-scraper tractor in a position at the front tractor and just to the left of an engine 12. The cab frame 10 is constructed of a plurality of steel box members welded together to form a hollow, rigid, box-like structure to which may be secured suitable plates (not shown) for forming side walls, a bottom and a top. As shown the cab frame 10 includes four vertical upper corner posts 14, 15, 16 and 17, a vertical lower corner post 20 and three inclined corner posts 22, 24 and 26. There are four cross members 29, 30, 31 and 32 connecting the upper ends of the posts 14, 15, 16 and 17 and two intermediate cross members 33 and 34 at the front and back of the frame 10. Three cross members 35, 36 and 37 connect the lower ends of the posts 22, 20 and 24. The connections between posts and cross members are formed by joint members 40, also of box construction, all connections being welded so that the resulting frame 10 is an integral rigid unit. An operator's seat 42 is disposed inside the cab frame 10 and is rigidly secured to the cab frame 10 as by means of mounting plates 44. Also disposed within the cab frame 10 is a steering wheel 46 and other operator controls (not shown). It will be seen that an operator occupying the seat 42 is "encapsulated" by the cab frame 10 in the sense that he is protected on all sides by the posts and cross members.

In accordance with the principles of the present invention the cab 10 described above is rigid whereas the supports and mounting means which attach the cab 10 to the vehicle frame are constructed to bend and deform in the event of roll-over to thereby absorb the impact energy. In the illustrated embodiment the vehicle frame includes two spaced-apart longitudinal main frame members 48 and 50 each of which includes an outwardly facing channel member 52 and a vertical side plate 54 welded together to form an upper portion of hollow box configuration. Each side plate 54 extends downwardly beyond its respective channel and is curved inwardly to form a strengthening flange 56. A smaller channel member 58 is also welded to each side plate 54 above the flange 56.

Primary support for the cab frame 10 is provided by two transverse box beams 60 and 62 which extend laterally beyond the left main frame member 50 so that the cab frame 10 is supported outboard of the vehicle frame. The forward box beam 60 spans the space between the main frame members 48 and 50 and is welded to both of the latter with the aid of suitable reinforcing plates. Conveniently the forward beam 60 is an integral structure passing through the main frame members 48 and 50. The rearward beam 62 also passes through and is welded to the left main frame member 50, but it need not span the space between the main frame members. A channel-shaped bumper 59 is welded to the outer ends of the beams 60 and 62, and a front bumper 61 is welded to the front ends of the main frame members 48 and 50 and to the front end of the side bumper 59.

The cab frame 10 is pivotally mounted to the transverse beams 60 and 62 for lateral tilting movement about an axis which is parallel to the longitudinal axis of the vehicle. To accomplish this a vertical plate 64 is welded to the front and rear surface of each beam 60 and 62 near their outer ends, the plates 64 projecting upwardly beyond the beams 60 and 62 and being provided with pin-receiving holes. Ears or lugs 66 and 68 depending from the cab frame 10 lie between the pairs of plates 64 and are held in place by pivot bolts 70. A further pair of plates 72 is welded to the forward beam 60 near the left main frame member 50 for receiving an ear or lug 74 depending from the cab frame 10 when the latter is in its full upright position. In this position of the cab frame 10 the lug 74 is pinned to the plates 72 by a removable bolt (not shown).

In FIG. 1 the bolt has been removed and the cab frame 10 is shown tilted outwardly. It will be seen that the lower inboard surface of the cab is now generally vertical so that considerable access space exists to the left of the engine 12. The inclined configuration of the lower portion of the cab thereby provides an advantage in that adequate side access is provided by only a small amount of cab tilt, for example 15° of tilt from the vertical position. In the tilted position the upper inboard surface of the cab is inclined outwardly away from the engine 12 to provide ample access from above so that the engine 12 can easily be removed from the vehicle.

Referring again to the mounting of the cab frame 10 to the vehicle frame there is provided a special post 76 which is connected between the inboard side of the cab frame 10 and the vehicle frame in a manner to absorb energy during roll-over. The upper end of the post 76 is rigidly connected to the cab frame 10 as by welding but it lies outside the operator space and does not contribute to the rigidity of the frame 10. The lower end of the post 76 connects with the left main frame member 50 to transmit force thereto during roll-over. Since the cab frame 10 is tiltable, the connection between the post 76 and the frame member 50 must be releasable, and to this end there is provided a pin connection which includes a plate 78 welded to the frame member 50, an inverted U-shaped bracket 80 carried by the lower end of the post 76 and a removable bolt 82 passing through the plate 78 and the bracket 80. It will be seen that in the upright position of the cab the post 76 is vertical.

The mounting plate 78 is also welded to a transverse vehicle frame member 84 which is rigidly connected to both main frame members 48 and 50. As seen in FIG. 5 a further transverse frame member 86 disposed aft of the member 84 is also welded to the main frame members 48 and 50. These transverse members 84 and 86 are primarily for tying together the main frame members 48 and 50 but they also serve to absorb energy transmitted to them through the post 76 in the event of roll-over.

A horizontal engine protection plate 88 is connected to the lower surface of main frame members 48 and 50, as by means of bolts 90 threaded into the flanges 56, in order to protect the engine 12 from damage from below. In the present invention this plate 88 also serves to absorb energy transmitted to it during roll-over. It has been found from tests that the threads of the bolts 90 have suffered damage during roll-over showing that relative movement between the main frame members has been resisted.

It is to be noted that the cab frame 10 is flexibly or resiliently mounted onto the vehicle frame. Disposed within lug members 66, 68 and 74 are resilient rubber sleeves 92 which may be of a commercially available type. FIG. 3 is an oversized view taken along lines 3—3 of FIG. 2 and illustrates the relationship of a rubber sleeve 92 inserted into the lug member 66. The sleeve 92 is provided with an inner metal sleeve 94 for contacting a pin or bolt inserted therethrough. An outer metal sleeve 96 is arranged between the rubber sleeve and the lug 66. From a consideration of FIG. 4, there is shown a similar flexible rubber sleeve member 92 inserted in the lug member 68. Inner and outer metal sleeves 94 and 96 are also provided.

In a like manner the lug member 74 is secured by means of a bolt to the plates 72. The U-shaped bracket 80 disposed at the bottom end of post member 76 is flexibly mounted to the plate 78 by means of a rubber mount 98 which surrounds the bolt 82. Thus, it can be seen that the cab 10 is flexibly or resiliently mounted to the frame 12 when the cab 10 is secured thereto. Such a flexible mounting greatly reduces vibration from the engine and wheels and from the power train arrangement so as to promote operator comfort and efficiency.

During operation of the vehicle the cab frame 10 is secured in an upright position by means of the releasable connections 72 and 78. In the event of a roll-over the cab frame 10 will be subjected to lateral forces tending to rotate the cab in the direction of arrow B in FIG. 1 and tending to distort the frame 10. However, the distortion of the frame 10, except for minor elastic deformation of the frame members, is prevented by the mounting structure which is constructed to distort elastically and plastically so as to absorb the energy which might otherwise distort or rupture the frame. The primary energy-absorbing members are the transverse beams 60 and 62 and the post 76. The beams 60 and 62 tend to become bent upwardly and transmit some of this bending force to the main frame members 48 and 50. At the same time the post 76 tends to become collapsed and transmits some of this force to the main frame members 48 and 50 while the frame continues to pivot. Actual roll-over tests have shown that the beams 60 and 62 and the post 76 plastically deform while the relatively rigid frame 10 undergoes no plastic deformation. The initial size and shape of the operator space within the frame 10 is therefore maintained. That is, all parts of the frame 10 remain spaced from the operator, provided that he is retained in the seat 42 by his seat belt, and this will be true even if the frame 10 should be torn loose from the vehicle.

Of course, some energy will be absorbed by other structural members during roll-over. As indicated above the beams 60 and 62 transmit stresses to the main frame members 48 and 50. This may cause a slight relative twisting movement between the main frame members 48 and 50 which is ultimately absorbed by deformation of the bottom plate 88 and/or the bolts 98 which secure the plate 88 to the members 48 and 50.

With the cab 10 constructed as an integrated unit flexibly mounted to the vehicle frame, all components within the scope of operational control are secured within the cab 10. The controls are pre-assembled in the cab before it is mounted on the vehicle frame 12, and a flexible connection is used to lead from the cab to the mechanisms controlled from within the cab. In order to tilt the cab to its FIG. 1 position the connections 72 and 78 are released and the cab is pivoted by a suitable jack mechanism (not shown) so as to allow ample space for maintenance or removal of the engine 12.

While the invention has been particularly shown and described with reference to the foregoing preferred embodiment herein, it will be understood by those skilled in the art that other changes in form and detail may be made therein without departing from the spirit and scope of the invention as defined in the appended claims.

What is claimed is:

1. In combination with a vehicle having a main frame which includes two spaced-apart longitudinally extending main frame members, an operator cab frame constructed of posts and cross members connected together to form a rigid cage having an interior space, an operator seat inside said cage and rigidly connected to said cab frame, and mounting means interconnected to said cab frame and to said vehicle frame for normally holding said cab frame in a fixed position and for preferentially absorbing energy by plastic deformation when lateral forces are applied to said cab frame in a direction tending to swing said cab frame relative to said main frame in the event of roll-over of the vehicle, whereby said cab frame remains intact and plastically undeformed during roll-over, said mounting means including two transverse beams both secured to at least one of said main frame members and extending laterally thereof so as to support said cab frame from below in a position outboard of said main frame, and connecting means connecting said cab frame to said beams at locations near the outer ends of said beams and a plastically deformable compression post extending downwardly from said cab frame and pivotally connecting with said main frame at a location which is spaced rearwardly from both of said beams, said main frame including at said location a transverse frame member rigidly connected to both of said main frame members, said post and said transverse beams being preferentially plastically deformable relative to said posts and cross members which form said cab frame.

* * * * *